United States Patent [19]

Béchade

[11] Patent Number: 5,568,410
[45] Date of Patent: Oct. 22, 1996

[54] METHOD AND APPARATUS FOR DETERMINING THE AMOUNT OF LEADING ZEROS OR ONES IN A BINARY DATA FIELD

[75] Inventor: Roland A. Béchade, South Burlington, Vt.

[73] Assignee: International Business Machines Corporation, Armonk, N.Y.

[21] Appl. No.: 315,051

[22] Filed: Sep. 29, 1994

[51] Int. Cl.⁶ ................................................ G06F 7/00
[52] U.S. Cl. ............................................... 364/715.1
[58] Field of Search ........................... 364/715.04, 715.1, 364/748, 745

[56] References Cited

U.S. PATENT DOCUMENTS

| | | | |
|---|---|---|---|
| 4,586,154 | 4/1986 | Berry | 364/748 |
| 4,631,696 | 12/1986 | Sakamoto | 364/748 |
| 4,785,421 | 11/1988 | Takahashi et al. | 364/715.04 |
| 4,794,557 | 12/1988 | Yoshida et al. | 364/748 |
| 4,887,084 | 12/1989 | Yamaguchi | 341/160 |
| 4,901,270 | 2/1990 | Galbi | 364/786 |
| 4,928,259 | 5/1990 | Galbi | 364/745 |
| 4,999,800 | 3/1991 | Birger | 364/748 |
| 5,010,508 | 4/1991 | Chan | 364/748 |
| 5,027,308 | 6/1991 | Sit | 364/748 |
| 5,081,698 | 1/1992 | Kohn | 395/122 |
| 5,091,874 | 2/1992 | Watanabe et al. | 364/715.10 |
| 5,101,484 | 3/1992 | Kohn | 395/375 |
| 5,155,816 | 10/1992 | Kohn | 395/375 |
| 5,157,388 | 10/1992 | Kohn | 340/800 |
| 5,204,828 | 4/1993 | Kohn | 364/736 |
| 5,241,490 | 8/1993 | Poon | 364/715.04 |
| 5,241,636 | 8/1993 | Kohn | 395/375 |
| 5,265,227 | 11/1993 | Kohn | 395/400 |
| 5,276,847 | 1/1994 | Kohn | 395/425 |

FOREIGN PATENT DOCUMENTS 2223111 3/1990 United Kingdom.

OTHER PUBLICATIONS

IBM Technical Disclosure Bulletin, "Fast and Modular 2048-Bit to 11-Bit Priority Ender", pp. 225–229, Jan. 1994.

*Primary Examiner*—Roy N. Envall, Jr.
*Assistant Examiner*—Chuong D. Ngo
*Attorney, Agent, or Firm*—Sughrue, Mion, Zinn Macpeak & Seas

[57] ABSTRACT

A high speed apparatus and method for determining the number of leading zeros or ones in a binary data field, in particular, a fixed-sized field, and further, indicating whether all of the bits of the binary data field are zero or one, is provided. The apparatus includes a plurality of detector circuits, coupled in parallel, to input different sections of the binary data field. For a leading zero detection operation, each detector circuit is configured to identify the bit location which contains the most significant "1" of the section of the binary data field which the detector inputs, and output a binary number signal representing the number of zeros leading that most significant "1". Each detector circuit also determines whether each bit location in the section which the detector inputs contains a "0" and provides a zero-detect signal representing this condition. The binary number signals and zero detect signals are provided to decoder circuitry and a plurality of multiplexor circuits which cooperate, based on these signals, to output a binary number signal representing the number of leading zeros in the entire binary field, and a zero detect signal indicating whether every bit location in the entire binary field contains a "0". The binary number signal representing the number of leading zeros in the entire binary field can then be provided to shifting circuitry to shift the binary field as desired to normalize the binary field.

18 Claims, 9 Drawing Sheets

FIG. 2A

| | | | | | | | | | | | | | | | LSB |
|---|---|---|---|---|---|---|---|---|---|---|---|---|---|---|---|
| 0 | X | X | X | X | X | X | X | X | X | X | X | X | X | X | 1 |
| 1 | X | X | X | X | X | X | X | X | X | X | X | X | X | 1 | 0 |
| 2 | X | X | X | X | X | X | X | X | X | X | X | X | 1 | 0 | 0 |
| 3 | X | X | X | X | X | X | X | X | X | X | X | 1 | 0 | 0 | 0 |
| 4 | X | X | X | X | X | X | X | X | X | X | 1 | 0 | 0 | 0 | 0 |
| 5 | X | X | X | X | X | X | X | X | X | 1 | 0 | 0 | 0 | 0 | 0 |
| 6 | X | X | X | X | X | X | X | X | 1 | 0 | 0 | 0 | 0 | 0 | 0 |
| 7 | X | X | X | X | X | X | X | 1 | 0 | 0 | 0 | 0 | 0 | 0 | 0 |
| 8 | X | X | X | X | X | X | 1 | 0 | 0 | 0 | 0 | 0 | 0 | 0 | 0 |
| 9 | X | X | X | X | X | 1 | 0 | 0 | 0 | 0 | 0 | 0 | 0 | 0 | 0 |
| 10 | X | X | X | X | 1 | 0 | 0 | 0 | 0 | 0 | 0 | 0 | 0 | 0 | 0 |
| 11 | X | X | X | 1 | 0 | 0 | 0 | 0 | 0 | 0 | 0 | 0 | 0 | 0 | 0 |
| 12 | X | X | X | 1 | 0 | 0 | 0 | 0 | 0 | 0 | 0 | 0 | 0 | 0 | 0 |
| 13 | X | X | 1 | 0 | 0 | 0 | 0 | 0 | 0 | 0 | 0 | 0 | 0 | 0 | 0 |
| 14 | X | 1 | 0 | 0 | 0 | 0 | 0 | 0 | 0 | 0 | 0 | 0 | 0 | 0 | 0 |
| 15 | 1 | 0 | 0 | 0 | 0 | 0 | 0 | 0 | 0 | 0 | 0 | 0 | 0 | 0 | 0 |
| MSB | | | | | | | | | | | | | | | |

FIG. 2B

| D | E | F | G |
|---|---|---|---|
| 0 | 0 | 0 | 0 |
| 0 | 0 | 0 | 1 |
| 0 | 0 | 1 | 0 |
| 0 | 0 | 1 | 1 |
| 0 | 1 | 0 | 0 |
| 0 | 1 | 0 | 1 |
| 0 | 1 | 1 | 0 |
| 0 | 1 | 1 | 1 |
| 1 | 0 | 0 | 0 |
| 1 | 0 | 0 | 1 |
| 1 | 0 | 1 | 0 |
| 1 | 0 | 1 | 1 |
| 1 | 1 | 0 | 0 |
| 1 | 1 | 0 | 1 |
| 1 | 1 | 1 | 0 |
| 1 | 1 | 1 | 1 |

METHOD AND APPARATUS FOR DETERMINING THE AMOUNT OF LEADING ZEROS OR ONES IN A BINARY DATA FIELD

TECHNICAL FIELD

The present invention relates to a high speed apparatus and method for determining the amount of leading zeros or ones in a binary data field, in particular, a fixed-size binary data field such as a mantissa of a floating point binary number and further, for providing a zero detect indicating whether all of the bits of the binary data field are 0.

BACKGROUND ART

In modern computers, data bytes are typically stored in memory as a binary data field, consisting of 1's and 0's. In particular, decimal numbers are represented and stored as a binary number field.

TABLE 1 below illustrates the representation of decimal numbers 0 to 10 in binary form.

| DECIMAL | BINARY |
| --- | --- |
| 0 | 0 |
| 1 | 1 |
| 2 | 10 |
| 3 | 11 |
| 4 | 100 |
| 5 | 101 |
| 6 | 110 |
| 7 | 111 |
| 8 | 1000 |
| 9 | 1001 |
| 10 | 1010 |

For example, decimal number "5" is equal to:

$$1\times2^2+0\times2^1+1\times2^0$$

which is represented as "101". Moreover, decimal number "10" is equal to:

$$1\times2^3+0\times2^2+1\times2^1+0\times2^0$$

which is represented as "1010".

Binary numbers are typically formatted as floating point numbers. For example, the binary number "101" (decimal number "5") can be represented in floating point binary notation as either $$1.01\times2^2 \qquad \text{(A)}$$

or $$0.101\times2^3 \qquad \text{(B)}$$

depending on the desired convention, that is, whether the most significant "1" is to be positioned to the left or right of the decimal point. The actual binary digits "101" are known as the mantissa of the floating point number, while the value $2^n$ is the exponent. The value of the exponent represents the number of places that the binary number occupies to the right of the decimal point.

Hence, to determine the value of floating point binary number "$1.01\times2^2$", one would simply determine the value of the mantissa without the decimal point (e.g. determine the value of binary number "101", which is equal to decimal number "5"). Likewise, the value of floating point binary number "$0.101\times2^3$" is determined in the same manner. In other words, the decimal point is viewed as being moved to the right the number of places indicated by the exponent (i.e. 3) to arrive at the binary number "101".

A floating point binary number is known as "normal" when the most significant bit of its mantissa is a "1", and is "denormal" when the most significant bit of its mantissa is "0". Hence, both of the floating point numbers (A) and (B) represented above are "normal".

For consistency, it is desirable to represent all floating point binary numbers in their "normal" form, regardless of their size. This is especially true in computers. In that regard, using format (B) above, the decimal numbers "1", "5" and "10" can be represented as normal floating point numbers $0.1\times2^1$, $0.101\times2^3$, and $0.1010\times2^4$, respectively.

However, in order to perform certain arithmetic operations of two floating point binary numbers, it is necessary that the exponents of both numbers are the same. For example, if one wishes to subtract "$0.101\times2^3$" (decimal number "5") from "$0.1010\times2^4$" (decimal number "10"), it is necessary to "denormalize" the number "$0.101\times2^3$", so that it is represented as "$0.0101\times2^4$". Thus, both numbers now having the exponent "$2^4$" can be subtracted to give the result "$0.0101\times2^4$" (decimal number "5"). Accordingly, so that this number is stored or recorded in a manner consistent with the other floating point numbers, it is desirable to "normalize" this number to "$0.101\times2^3$".

Such normalization is accomplished by shifting the binary data string a given number of bit positions to the left until the leading "1" is in the most significant bit position. Concurrently, a number representing the number of shifts to the left is subtracted from the exponent. In this example, the mantissa is shifted to the left by one bit, and accordingly, the exponent is decremented by 1.

Hence, to normalize a denormalized number, it is necessary to determine where the most significant "1" is located in the mantissa, or rather, the number of leading zeros before that most significant "1". Therefore, a computer capable of performing binary arithmetic operations must include a circuit capable of locating the leading "1" in a binary data field. It addition, it is also desirable that the circuit determine whether zeros are stored in all of the data bits of the binary data field, which indicates that the binary floating point number is "0" and that no normalization need be performed.

A conventional circuit for normalizing a binary data field is described in U.S. Pat. No. 4,586,154 to Berry. In the Berry circuit, an 8-bit fixed-size read-only memory U1 receives the "top" eight data bits of a 16-bit binary data word, while another 8-bit fixed-size read-only memory U2 receives the "bottom" eight data bits of the 16-bit binary data word.

The memories U1 and U2 analyze the top eight and bottom eight data bits, respectively, to determine the number of shifts required for normalization. If the memory U1 determines that the top eight bits are all "0" (or all "1" if the number is a negative number represented in two's complement format), or that more than seven shifts are required, the memory U1 outputs a signal (i.e. "1") at output $O_5$ to a quad 2:1 multiplexor U3. This signal indicates that the multiplexor U3 is to consider the binary data, representing the number of shifts required, that is being output from memory U2.

Conversely, if memory U1 determines that less than seven shifts are required, the memory U1 outputs a signal (i.e. "0") at output $O_5$ to the quad 2:1 multiplexor U3. This signal indicates that the multiplexor U3 is to consider the binary data, representing the number of shifts required, that is being output from memory U1.

Based the signal output at $O_5$ of memory U1, the multiplexor considers the binary data representing the number of shifts required that is provided by either U1 or U2, and controls the parallel shift network, comprising 4-bit parallel shifters U4–U11, to effect the shifting accordingly. In addition, if the binary data output from U2 is to be used, and indicates that all of the bottom eight bits are "0", then the entire 16-bit number is recognized as "0", and no shifting will occur.

The Berry circuit, however, has limited applications. For example, since the circuit is similar to a programmable logic array (PLA), it is not readily adaptable in data flow circuitry. Hence, for practical purposes, the circuit cannot be used effectively in conjunction with devices requiring high-speed data flow.

Another example of a conventional normalization circuit is described in U.S. Pat. No. 4,785,421 to Takahashi et al. In the Takahashi circuit, data from all 16-bits of a 16-bit data register are provided to a leading "1" detector circuit. The leading "1" detector circuit outputs 16 bits of data to an encoder, which in turn outputs a binary number representing the position of the leading "1" in the 16-bit data field.

Because the leading "1" detector of the Takahashi circuit comprises a large number of passgates in series (i.e. 16 passgates), the operation of the circuit is very slow by today's computer standards. Accordingly, the Takahashi circuit is not readily adaptable for high speed computers.

A third example of a conventional normalization circuit is described in U.S. Pat. No. 5,241,490 to Poon. The Poon circuit operates to normalize a 69-bit mantissa of a floating point number. To perform this function, eight 8-input OR gates are coupled in parallel so that each receives a different group of eight consecutive bits of data from the 69-bit field, while a single 5-input OR gate is coupled in parallel with the OR gates to receive a group of five consecutive data bits from the 69-bit field. In this arrangement, the five bit group includes the five least significant bits in the 69-bit field.

Each of the OR gates provides an output "0" when all of its inputs are "0", that is when all of the bits in the group of bits that it is receiving are "0", and provides an output "1" when any of its inputs are "1". Hence, the outputs of the OR gates act as a zero-detect for each bit group.

The 69-bit data field is also input to a multiplexor unit 109 which comprises nine byte selectors. Each of the byte selectors, except one, receives a different one of the eight 8-bit data groups described above, while that one remaining byte selector receives the single 5-bit data group. Hence, the nine byte selectors correspond to the eight 8-input OR gates and one 5-input OR gate.

The outputs of the OR gates, described above, are provided to a 9-bit input prioritizer circuit 105 such that the output from the OR gate which receives the 8-bit group of bits 69-62 (the most significant eight bits) of the 69-bit data field is the most significant bit of the 9-bit input, the output from the OR gate which receives the 8-bit group of bits 61-54 is the next significant bit, and so on. The output from the 5-input OR gate which receives bits 4-0 of the 69-bit data field is thus the least significant bit of the 9-bit input.

The prioritizer circuit recognizes which of the input bits are "1" and provides a 9-bit binary output signal having a "1" in the bit location corresponding to the most significant input that is "1". In other words, if the binary input to the nine input terminals of the prioritizer circuit is "001001010", with the leftmost bit being the most significant bit, the prioritizer circuit provides a binary output signal "001000000".

Each bit of the 9-bit output signal from the prioritizer circuit is input to one of the corresponding inputs A0–A8, respectively, of each of the byte selectors in the multiplexor unit 109. Hence, the byte selector receiving the "1" in the 9-bit output signal outputs the group of bits that it receives, which is the most significant group of bits containing at least one "1". Conversely, the byte selectors receiving the 0's in the 9-bit output from the prioritizer circuit will output 0's.

The outputs from all the byte selectors are OR'ed by OR gate 155 and thus, the multiplexor outputs a binary signal equal to the most significant bit group of the 69-bit field having at least one "1". This output signal from the multiplexor is input to a prioritizer circuit 111, which operates similar to the prioritizer circuit 105 described above. Accordingly, the signals output by both prioritizer circuits are used to shift the 69-bit data field by the appropriate number of bits.

However, the Poon circuit never outputs a single binary number representing the amount of leading zeros that are present in the 69-bit data field. That is, the circuit merely outputs two shift control signals which cause barrel shifters to shift the 69-bit data field a designated number of bits to the left. In particular, one of the control signals causes a barrel shifter to shift the 69-bit data field to the left in 8-bit increments to reach a designated 8-bit group containing the leading "1". Then, the second control signal is used to shift the data field bit-by-bit so that the leading "1" becomes the most significant bit.

The examples of conventional normalization circuits described above, illustrate that such circuits are often slow or occupy much chip real estate due to their complexity. In particular, the circuits which determine the amount of leading zeros in the binary data filed are often impractical due to their size or inability to provide high speed data flow. Therefore, a simplified normalization circuit having a high speed circuit for determining the amount of the leading ones or zeros in an data field, while also indicating if the data in the field is zero, is highly desirable.

DISCLOSURE OF INVENTION

Accordingly, an object of the present invention is to provide a high speed apparatus and method for determining the number of leading zeros or ones in a fixed-size binary data field and further, indicating whether all of the bits of the binary data field are zero or one. To achieve this object, the apparatus of the present invention comprises a plurality of detector circuits, coupled in parallel, to input different sections of the binary data field. The detector circuits each comprise a predetermined number of logic circuits such as NAND and NOR gates, inverters, passgates or the like.

For the leading zero detect operation, each detector circuit is configured to identify the bit location which contains the most significant "1" of the section of the binary data field which the detector inputs, and output a binary number signal representing the number of zeros leading (e.g. to the left of) that most significant "1". Each detector circuit also determines whether each bit location in the section which the detector inputs contains a "0", and provides a zero-detect signal representing this condition.

The binary number signals and zero detect signals are provided to decoder circuitry and a plurality of multiplexor circuits, namely, a predetermined number of 2-way and 4-way multiplexor circuits. The multiplexors each comprise a predetermined number of logic circuits such as passgates, inverters, or the like. The decoder circuitry and multiplexors cooperate, based on the binary number signals and zero detect signals provided by the detector circuits, to output a binary number signal representing the number of leading zeros in the entire fixed-size binary field, and a zero detect signal indicating whether every bit location in the entire fixed-size binary field contains a "0".

The binary number signal representing the number of leading zeros in the entire fixed-size binary field can then be provided to shifting circuitry, such as barrel shifters or the like, to shift the binary field as desired to thereby normalize the binary field.

The apparatus of the present invention as described above is easily modified to determine the number of leading ones in a fixed size binary data field and also, to provide a "one detect", instead of a zero detect, to determine if all bits in the binary data field include a "1". Moreover, the apparatus can be easily adapted to detect the number of leading ones or zeros in the direction towards the most significant bit or the least significant bit of the binary data field. Furthermore, the apparatus of the present invention is easily adaptable to determine the number of leading ones or zeros, and provide the zero or one detect as desired, for any size binary data field.

The foregoing and other objects, features and advantages of the invention will be apparent from the following more particular description of preferred embodiments of the invention, as illustrated in the accompanying drawings.

BRIEF DESCRIPTION OF DRAWINGS

FIG. 2A is a chart showing all possible bit locations of a leading "1" in a 16-bit binary data field;

FIG. 2B is a chart, corresponding to FIG. 2A, which illustrates the status of the output signals provided by the embodiment of FIG. 1 in relation to the position of the leading "1" in the 16-bit binary data field;

FIG. 4, 4A and 4B are a circuit diagram of the embodiment of the present invention shown in FIG. 1;

BEST MODE FOR CARRYING OUT THE INVENTION

Figure 1:
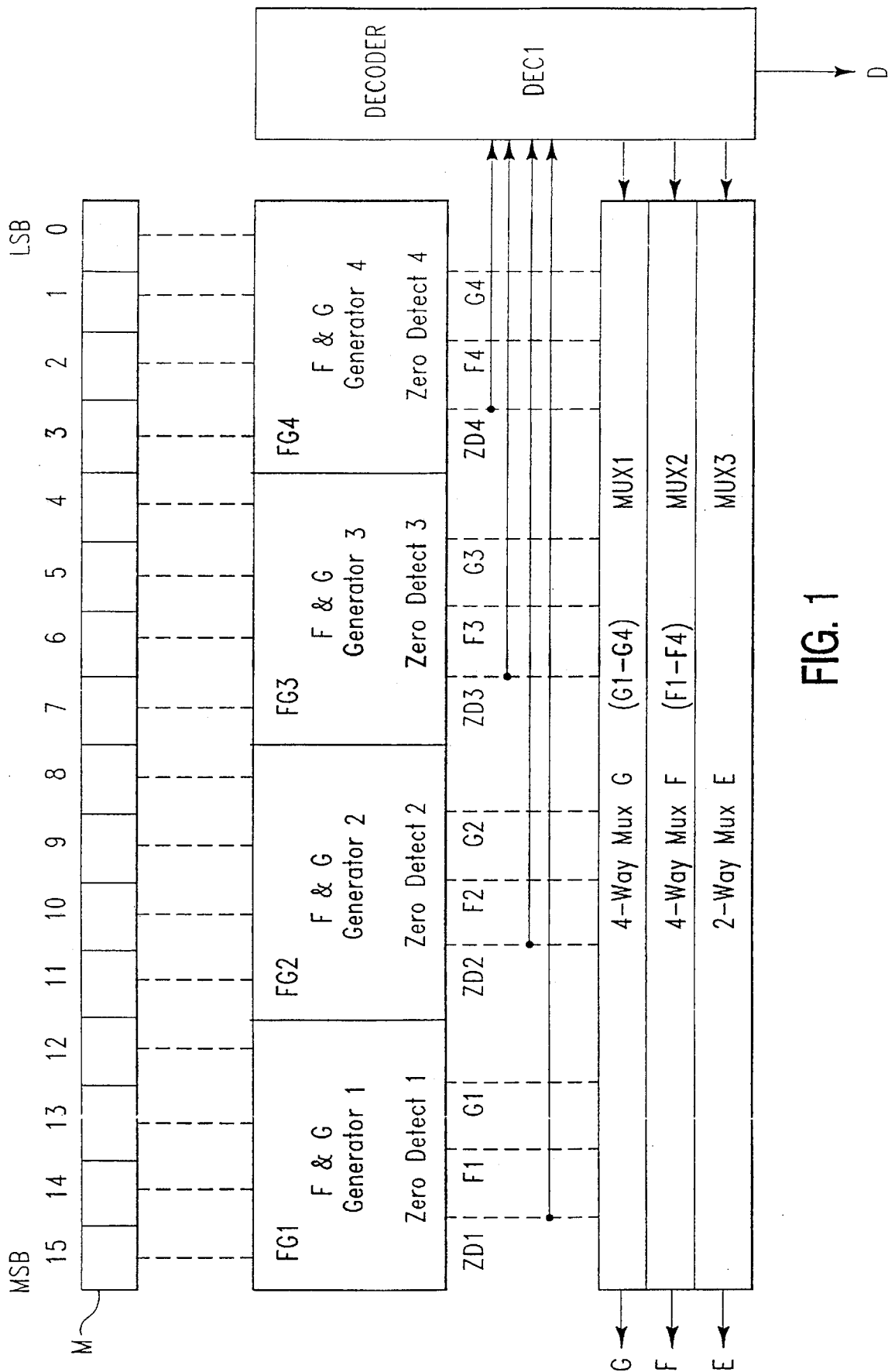
FIG. 1 is a block diagram illustration of an embodiment of the apparatus of the present invention for determining the number of leading zeros in a 16-bit binary field and also providing a zero detect signal.

An embodiment of the present invention for detecting the number of leading zeros or ones in a 16-bit binary data field, such as that representing the mantissa of a floating point number, is shown in FIG. 1. This circuit also provides a zero detect signal indicating when all bits in the binary data field are "0".

The circuit of FIG. 1 comprises four F-G generators FG1–FG4. Each F-G generator is assigned to detect four bits of the 16-bit binary data field stored in a fixed-size, 16-bit memory location M.

That is, in this particular embodiment, FG1 is assigned to receive bits 15 to 12, which are the four most significant bits of the data field. FG2 is assigned to bits 11 to 8, the next significant bits. FG3 and FG4 are thus assigned to detect bits 7 to 4 and 3 to 0, respectively, with bits 3 to 0 being the least significant bits of the data field.

Each F-G generator FG1–FG4 outputs a binary "F" signal and a binary "G" signal based on the status of the bits in the bit locations to which the F-G generator is assigned to detect. The "F" or "G" signals will be "1" or "0" depending on the bit location of the most significant "1" in the data string. Such a relationship is shown, for example, in FIG. 2A. The X's indicate a "don't care" condition, that is, bits in the "X" locations can be a "1" or "0" for this embodiment.

That is, regarding FG generator FG4, if the most significant "1" is stored at bit location 3 in the data string, both signals "F" and "G" will be 0, thus representing the binary number "00", which equals the decimal number "0", indicating no leading zeros. If the most significant "2" is stored at bit location 1, signal "F" will be 0 and signal "G" will be 1, thus representing the binary number "01" which is equal to the decimal number "1", indicating one leading zero Accordingly, if a "1" is stored at bit location 1, signal "F" will be 1 and signal "G" will be 0, thereby representing the binary number "10" which is equal to the decimal number "2", thus indicating two leading zeros. Finally, if a "1" is stored at bit location "0" both signals "F" and "G" will be 1, thus representing the binary number "11" which is equal to decimal number "3", which indicates three leading zeros.

An embodiment of the circuitry of an F-G generator which generates the outputs "F" and "G" in the manner described above is shown in FIG. 3. For convenience, the F-G generator shown in FIG. 3 will be described as F-G generator FG4. However, all F-G generators FG1–FG4 have circuitry identical to the circuit shown in FIG. 3 and operate in an identical manner in response to the values stored in the bit locations of the 16-bit data string to which they are assigned to receive.

Figures 2C, 3:
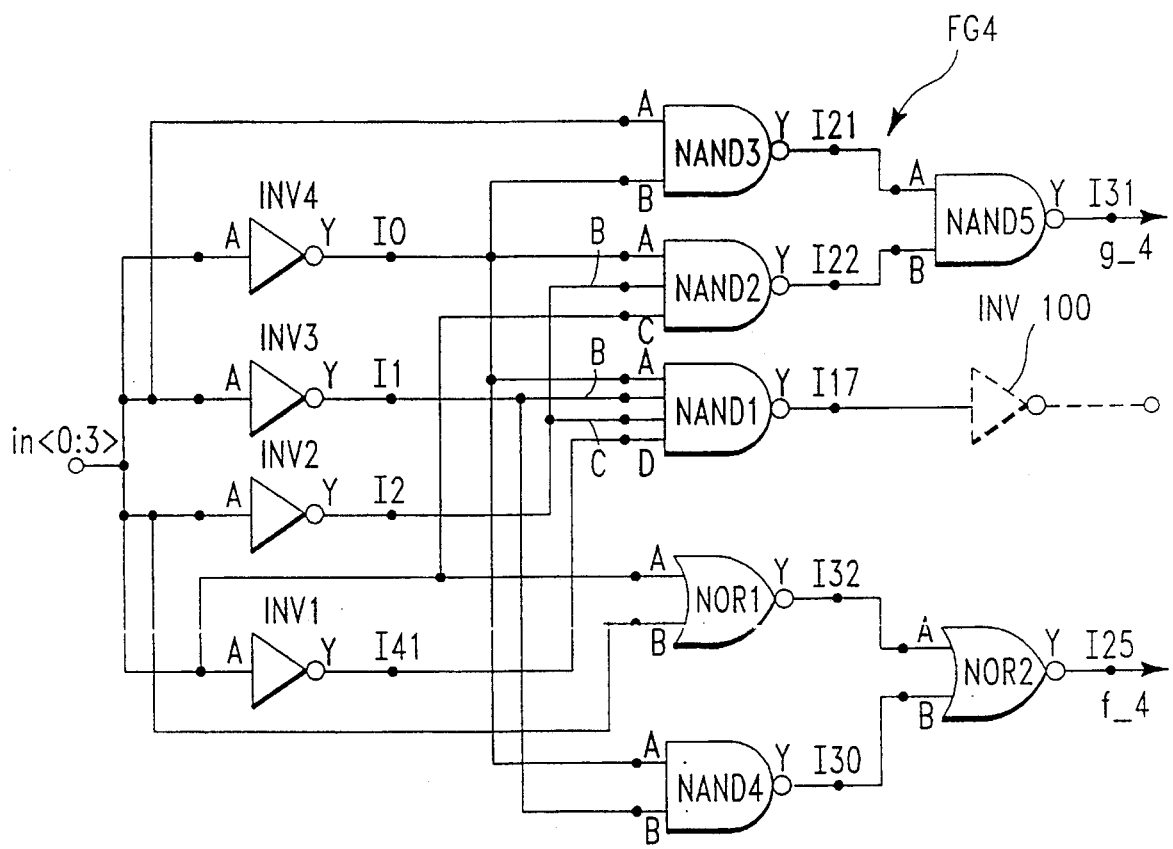
FIG. 2C is a chart showing the correspondence between the selection of the F&G generator circuits of the embodiment of FIG. 1 as indicated by the status of zero detects of the detections circuits.
FIG. 3 is a circuit diagram of an embodiment of an F&G generator circuit of the embodiment of the present invention shown in FIG. 1.

As shown in FIG. 1, FG4 receives a single input from each data bit location 3-0 of the stored data string. Hence, as shown in FIG. 3, the data from bit locations 0, 1, 2 and 3 are input to inverters INV1, INV2, INV3, and INV4, respectively. The inverters INV1–INV4 invert the data so that an input "1" is output as a "0", and vice versa. The outputs of all the inverters INV1–INV4 are input to a four-input NAND gate NAND1, which outputs a complement of a "zero-detect" signal which will now be described.

The "zero-detect" signal indicates when the data at all bit locations assigned to that particular F-G generator are "0". That is, in the embodiment shown in FIG. 3, when the inputs to inverters INV1–INV4 are all "0" each inverter will provide an output signal "1". These four 1's are input to NAND gate NAND1, which accordingly will output a signal "0". Thus, a complement zero-detect signal "0" in this embodiment indicates that a "0" is present at the four least significant bit locations 0 through 3. Of course, if the zero-detect signal is to be a "1", which is a standard representation, another inverter INV100 can be coupled to the output of NAND1, and the zero detect signal can be taken from the output of inverter INV100.

Each stage of logic is typically termed a "delay". That is, the stage of inverters INV1–INV4 is one delay, and the stage of NAND1 is another delay. Hence, the true zero detect value "1" (zero detect signals are conventionally "1" when all zeros are detected) is achieved by only one more delay, INV100.

Conversely, if a "1" detect is desired, such as in a twos-complement application, inverters INV1–INV4 are removed from the circuit, and the inputs are applied directly to NAND1. Hence, the output of NAND1 will be "1" when a "0" is in all of the 16-bits, and "0" when a "1" is in at least one bit location. The circuit also can easily be configured to detect the amount of leading 1's in the data field.

The data being provided to inverters INV1–INV3 of FIG. 3 are provided to further logic circuitry. In particular, the data from bit 0 of the 16-bit data string, which is being input to INV1, is also input to one terminal (terminal A) of a two-input NOR gate NOR1. Furthermore, the data from bit 0 of the 16-bit string is input to one terminal (terminal C) of a three-input NAND gate NAND2, which is described below in more detail.

The data from bit 1 of the 16-bit data string, which is being input to INV2, also is input to the other terminal (terminal B) of NOR1. The data from bit 2 of the 16-bit data string, which is being input to INV3, is input to one terminal (terminal A) of a two-input NAND gate NAND3, also which is described in more detail below.

The outputs of inverters INV2–INV4 are also input to further logic circuitry. In particular, the output of inverter INV2 is also input to a second terminal (terminal B) of NAND2. The output of inverter INV3 is also input to one terminal (terminal B) of another two-input NAND gate NAND4. Finally, the output of inverter INV4 is input to the second terminal (terminal A) of NAND4, the third terminal (terminal A) of NAND2, and the second terminal (terminal B) of NAND3.

The outputs of the NOR and NAND gates are provided to further logic circuitry which cooperate to ultimately provide the "F" and "G" signals. In particular, the output of NOR1 is input to one terminal (terminal A) of a two-input NOR gate NOR2. The output of NAND4 is input to the other terminal (terminal B) of NOR2. From this configuration, NOR gate NOR2 provides the "F" signal in the manner described above with reference to FIG. 2A.

Conversely, the outputs of NAND2 and NAND3 are input to first and second terminals (terminals B and A, respectively) of a fifth NAND gate NAND5. From this configuration, NAND5 provides the "G" signal in the manner described above With reference to FIG. 2A.

As discussed above, each of the F-G generators FG1–FG4 are configured and operate like the F-G generator circuit illustrated in FIG. 3. Accordingly, as shown in FIG. 2A, and as will be apparent from the circuit configuration shown in FIG. 4, discussed below, the pattern of the "F" and "G" outputs repeat for every four bit positions. That is, the FG output is "00" when the most significant "1" is in bit position 0, 4, 8 or 12, "01" when the most significant "1" is in bit position 1, 5, 9 or 13, "10" when the most significant "1" is in bit position 2, 6, 10 or 14, and "11" when the most significant "1" is in bit position 3, 7, 11 or 15.

In a 16-bit data field, there are 16 possible bit locations in which the most significant "1" can be. Therefore, as shown in FIGS. 2B, as it relates to FIG. 2A, a four-bit binary numeral is needed to represent all 16 possible locations.

Figure 4A:
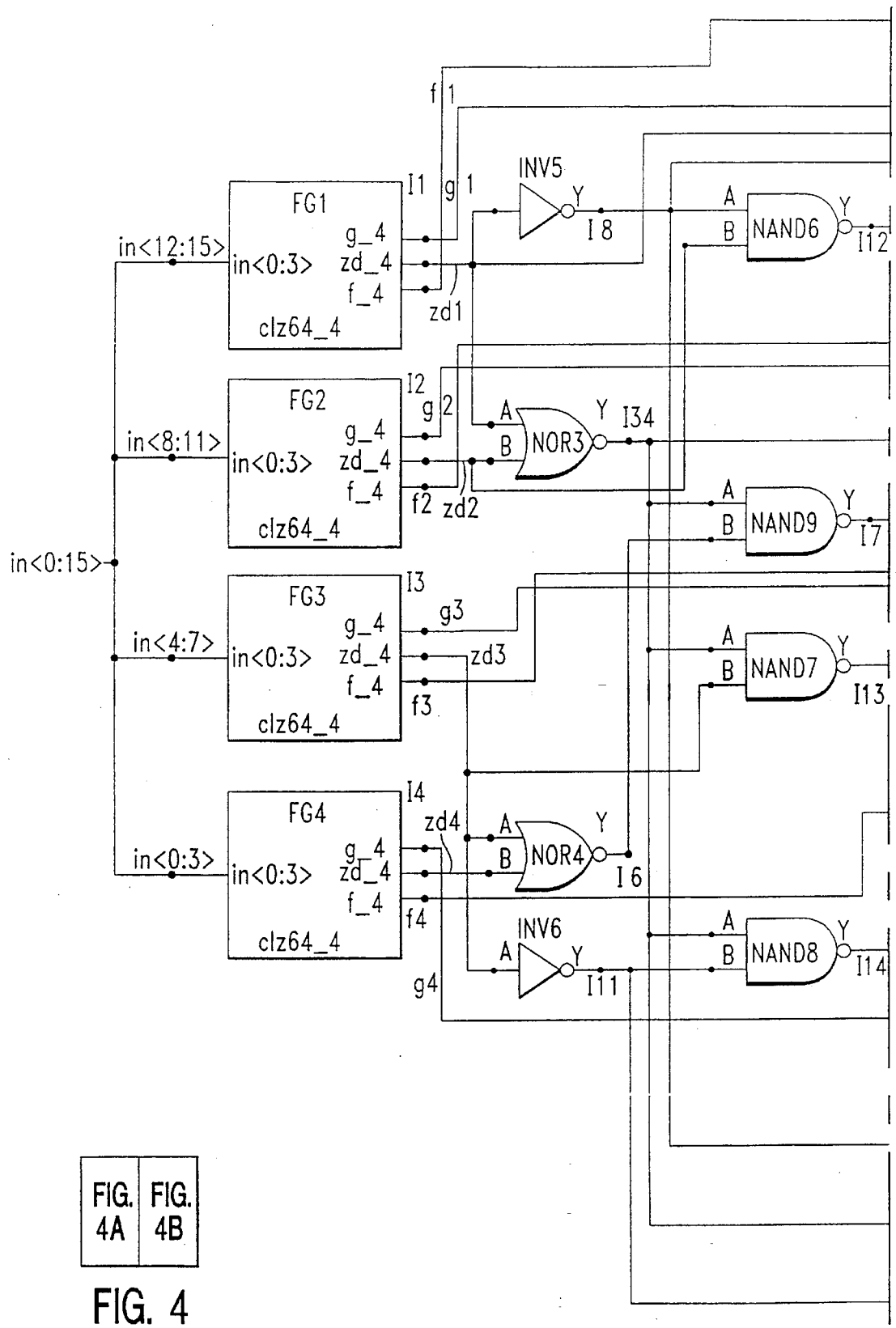
Figure 4B:
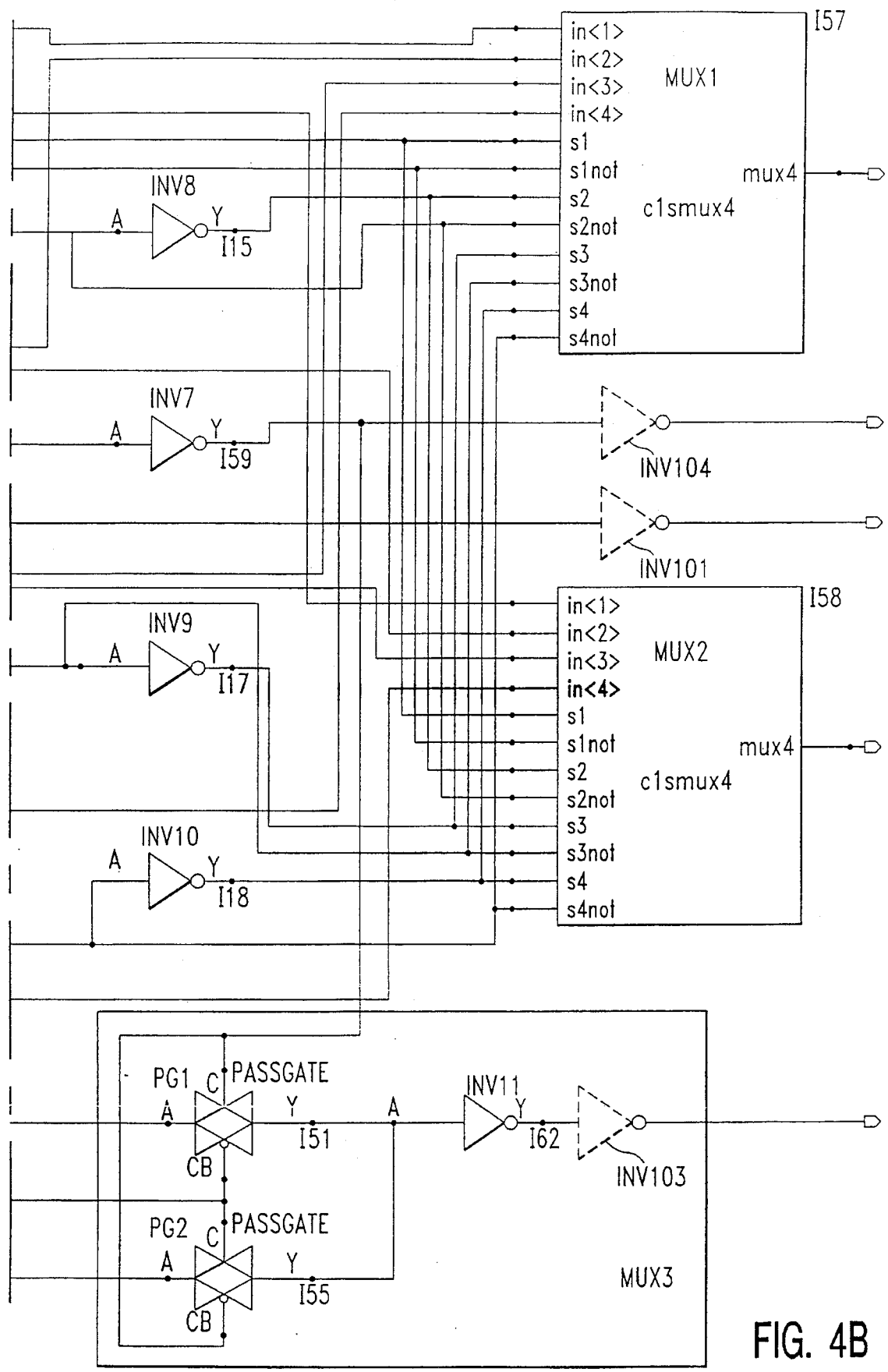

Accordingly, further logic circuitry, namely, the two 4-way multiplexors MUX1 and MUX2, the decoder circuitry DEC, and the single 2-way multiplexor MUX3, is employed to generate all four bits D, E, F and G shown in FIG. 2B. FIG. 4 illustrates an embodiment of this circuitry of the present invention for generating the four-bit binary numeral which represents the amount of leading zeros in the 16-bit data string.

As shown in FIG. 4, the entire 16-bit data string is input to F-G generators FG1–FG4 such that bits 15 to 12 are input to FG1, bits 11 to 8 are input to FG2, bits 7 to 4 are input to FG3, and bits 3 to 0 are input to FG4. As described above, each F-G generator generates an "F" and "G" output. The "F" output of F-G generators FG1–FG4 are provided to input terminals IN1, IN2, IN3 and IN4 of MUX1, respectively. On the other hand, the "G" outputs of FG1–FG4 are provided to input terminals IN1, IN2, IN3 and IN4 or MUX2, respectively. However, the zero-detect outputs ZD1–ZD4 of FG1–FG4, respectively, are provided to further logic circuitry, which forms the decoder DEC, and certain input terminals of MUX1 and MUX2, as now will be explained.

The zero-detect output ZD1 of FG1 is provided to an inverter INV5, as well as a first input terminal (terminal A) of a two-input NOR gate NOR3 and input terminals S1 of MUX1 and MUX2. The zero-detect output ZD2 of FG2 is provided to the second input terminal (terminal B) of NOR3, as well as to an input terminal (terminal B) of a two-input NAND gate NAND6. The zero-detect output ZD3 of FG3 is provided to an input terminal (terminal A) of a two-input NOR gate NOR4, as well as to an inverter INV6 and an input terminal (terminal B) of a two-input NAND gate NAND7. Finally, the zero-detect output ZD4 of FG4 is provided only to the other input terminal (terminal B) of NOR4.

As further shown in FIG. 4, the output of INV5 is provided to the other input terminal (terminal A) of NAND6, input terminals S1not of MUX1 and MUX2, and to an input terminal A of a passgate PG1 of the 2-way multiplexor MUX3. The output of INV6 is provided to an input terminal (terminal B) of a two-input NAND gate NAND8, and also to an input terminal A of a passgate PG2 of MUX3.

The output of NOR3 is input to an inverter INV7, an input terminal (terminal A) of a two-input NAND gate NAND9, the second input terminal (terminal A) of NAND7, and the second input terminal (terminal A) of NAND8. The output of NOR3 also is provided to terminal CB of passgate PG1, and terminal C of passgate PG2. The output of NOR4 is provided solely to the other input (terminal B) of NAND9.

The output of NAND6 is provided to an inverter INV8, as well as to input terminals S2not of MUX1 and MUX2. The output of NAND7 is provided to an inverter INV9, as well as to an input terminal S3not of MUX1, and an input terminal S3not of MUX2. Moreover, the output of NAND8 is input to an inverter INV10, as well as to an input terminal S4not of MUX1, and an input terminal S4not of MUX2.

The output of NAND9 provides a complement zero-detect signal ZD5 of the entire circuit. That is, the circuitry described above cooperates to output a complement zero-detect ZD5 of "0" if all bit locations of the entire 16-bit data field contain a "0". Hence, if a "1" zero detect is desired, as for the F-G generator shown in FIG. 3, an inverter INV101 can be added. Hence, the true zero detect signal is output with only one additional logic delay.

The output of inverter INV7 is provided to input terminals C and CB of passgates PG1 and PG2 of MUX3, respectively. The outputs of PG1 and PG2 are both provided to inverter INV11.

The output of INV8 is input to terminals S2 of MUX1 and MUX2, while the output of INV9 is input to terminals S3 of MUX1 and MUX2. Finally, the output of INV10 is input to terminals S4 of MUX1 and MUX2.

The operation of MUX1, MUX2 and MUX3, will now be described.

Figure 5:
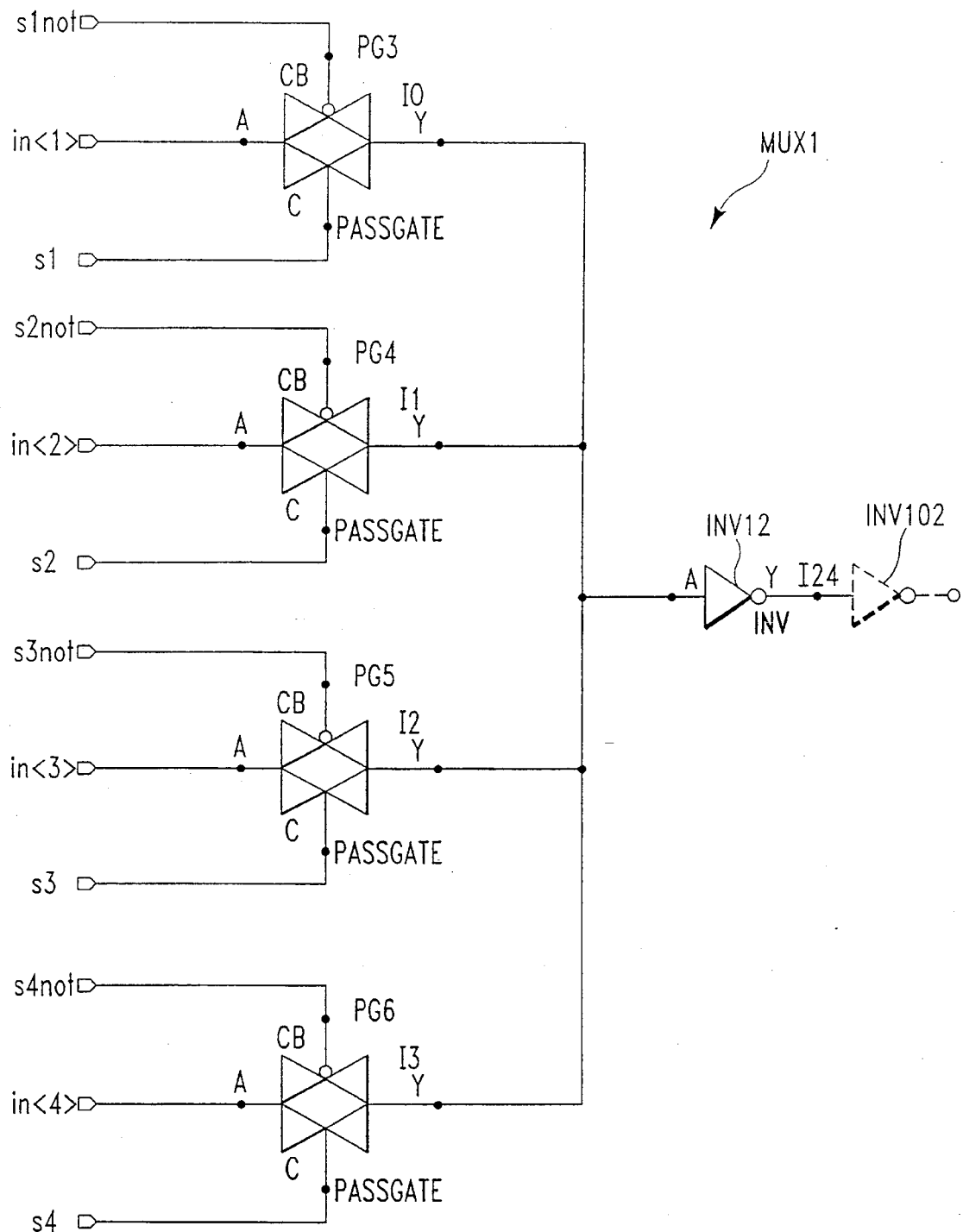
FIG. 5 is a circuit diagram of an embodiment of a 4-way multiplexor of the embodiment of the present invention shown in FIG. 1.

FIG. 5 illustrates an embodiment of a 4-way multiplexor, such as MUX1 and MUX2, of the present invention. Since both MUX1 and MUX2 have this circuit configuration, FIG. 5 will be described with reference to MUX1 only.

The 4-way multiplexor comprises four passgates PG3–PG6. Since FIG. 5 is discussed as MUX1, the inputs IN1–IN4, S1–S4 and S1not–S4not shown in FIG. 5 correspond to those inputs shown for MUX1 in FIG. 4. Passgates PG3–PG6 each operate as follows.

When a signal "1" is input to terminal "C" and a signal "0" is input to terminal "CB", a passgate such as PG3–PG6 outputs the signal input at its terminal "A". Conversely, when a signal "0" is input to terminal "C", and a signal "1" is input to terminal "CB", the passgate prevents the signal input at its terminal "A" from being output.

To output the desired "F" and "G" signals of the binary signal representing the position of the leading "1" in the 16-bit data field, the decoder circuitry DEC, along with FG1–FG4, as shown in FIG. 4, are arranged so that only one passgate PG3–PG6 of both MUX1 and MUX2 will be activated to pass its "A" input signal at any given time. That is, if the leading "1" is determined to be within the group of bits 15 to 12 being input to FG1, the decoder circuitry DEC1 and FG1–FG2 operate so that the passgates PG3 in both MUX1 and MUX2 are activated to pass their "A" input signal. Hence, the "F" and "G" signals output by FG1 are "passed" through passgates PG3 of MUX1 and MUX2 to the inverter INV12 of these multiplexors.

INV12 is present primarily to amplify the signal being output from any of the passgates PG3–PG6. In the 64-bit embodiment shown in FIG. 6 and described below, output to further circuitry is taken from the output of INV12 in MUX1 and MUX2. However, for the 16-bit application, to achieve the "F" and "G" bit pattern for the corresponding bit locations of the leading "1" as shown in FIGS. 2A and 2B, the outputs "F" and "G" can be taken at the input of INV12, thus avoiding inversion by INV12. Alternatively, another inverter INV102 can be added if the amplification is deemed necessary or desirable.

Similar to the operation described above, when the leading "1" is determined to be within the group of bits 11 to 8 being input to FG2, the decoder circuitry DEC1 and FG1–FG2 operate so that the passgates PG4 in both MUX1 and MUX2 are activated to pass their "A" input signal. Hence, the "F" and "G" signals output by FG2 are "passed" through passgates PG4 of MUX1 and MUX2 to the inverter INV12 of these multiplexors, and can be taken as described above.

Furthermore, when the leading "1" is determined to be within the group of bits 7 to 4 being input to FG3, the decoder circuitry DEC1 and FG1–FG2 operate so that the passgates PG5 in both MUX1 and MUX2 are activated to pass their "A" input signal. Hence, the "F" and "G" signals output by FG3 are "passed" through passgates PG5 of MUX1 and MUX2 to the inverter INV12 of these multiplexors, and can be taken as described above. Finally, when the leading "1" is determined to be within the group of bits 3 to 0 being input to FG4, the decoder circuitry DEC1 and FG1–FG2 operate so that the passgates PG6 in both MUX1 and MUX2 are activated to pass their "A" input signal. Hence, the "F" and "G" signals output by FG4 are "passed" through passgates PG6 of MUX1 and MUX2 to the inverter INV12 of these multiplexors, and can be taken as described above.

The passgates PG1 and PG2 of MUX3 operate in a similar manner. That is, for the 16-bit embodiment, as shown in FIG. 4, in relation to FIGS. 2A and 2B, when the leading "1" is determined to be in the groups of bits 11-8 or 3-0, the decoder DEC, PG1–PG4, and MUX3 cooperate so that the "E" signal will be "1". Conversely, when the leading "1" is determined to be in the groups of bits 15-12 or 7-4, the decoder DEC, PG1–PG4, and MUX3 cooperate so that the "E" signal will be "0".

As with the INV12 in MUX1 and MUX2, INV11 is present primarily to amplify the signal being output from passgate PG1 or PG2. Hence, to achieve the "E" bit pattern for the corresponding bit locations of the leading "1" as shown in FIGS. 2A and 2B, the output "E" can be taken at the input of INV11, thus avoiding inversion by INV11. Alternatively, another inverter INV103 can be added if the amplification is deemed necessary or desirable.

Finally, for the 16-bit embodiment, as shown in FIGS. 2A and 2B, when the leading "1" is determined to be in the groups of bits 15-8, the decoder DEC1 and PG1–PG4 cooperate so that the "D" signal will be "0". Conversely, when the leading "1" is determined to be in the groups of bits 7-0, the decoder DEC1 and PG1–PG4 cooperate so that the "D" signal will be "1". INV7 is present primarily to provide a signal to control passgates PG1 and PG2 in the desired manner. Hence, to achieve the "D" bit pattern for the corresponding bit locations of the leading "1" as shown in FIGS. 2A and 2B, the output "D" can be taken at the input of INV7, thus avoiding inversion by INV7. Alternatively, another inverter INV104 can be added if the amplification is deemed necessary or desirable.

Accordingly, the above embodiment provides a high speed circuit which both outputs a zero-detect if all bit of a 16-bit data field are "0", and locates the position of the leading "1" to provide an binary output indicating the amount of leading 0's in the 16-bit data field. This binary output and zero detect signal can be provided to shifting circuitry (not shown), such as a barrel shifter or the like, to normalize the binary data field if desired.

Figure 6:
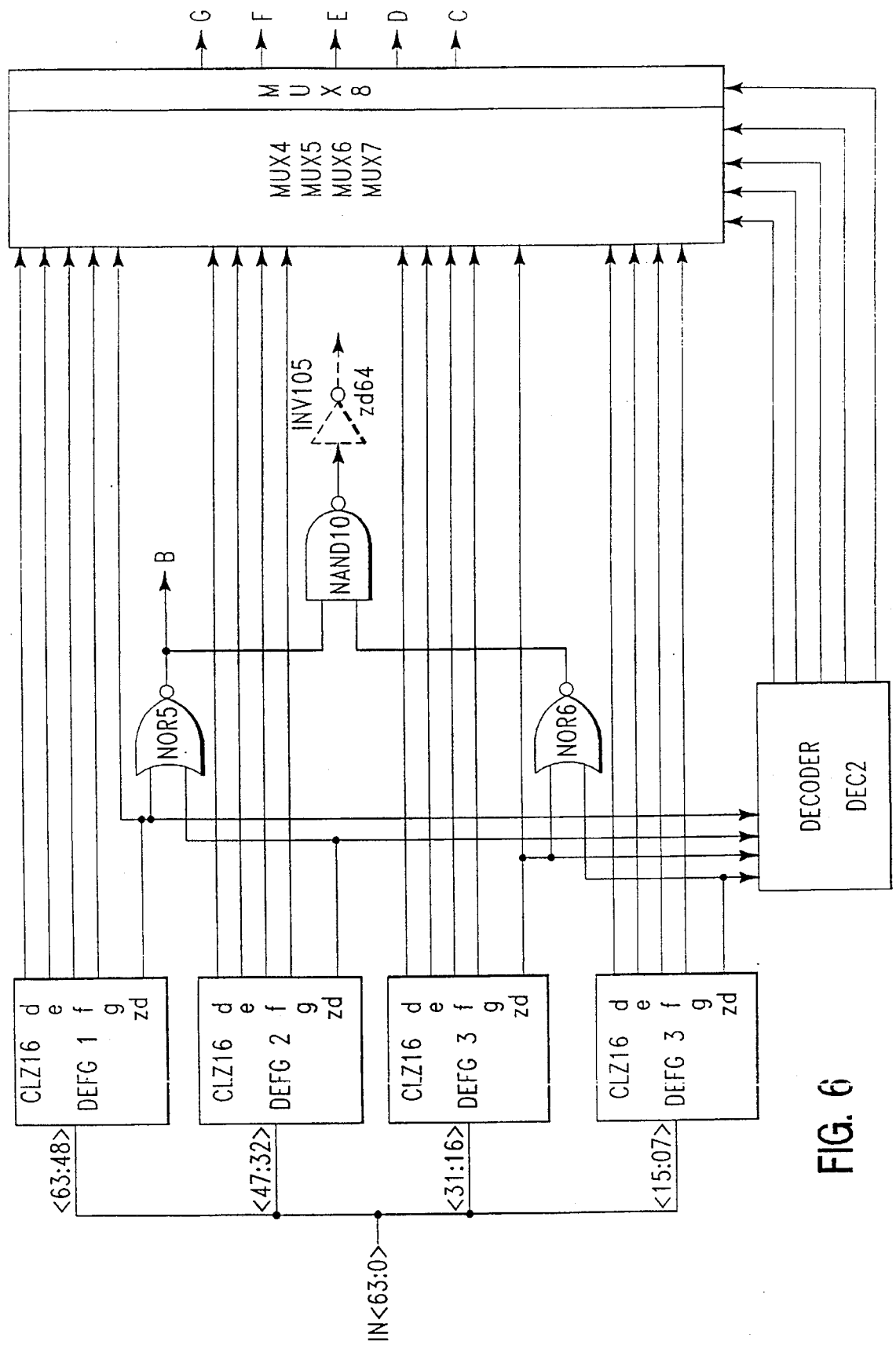
FIG. 6 is a block diagram illustration of an embodiment of the apparatus of the present invention for determining the number of leading zeros in a 64-bit binary field and also providing a zero detect signal.
Figure 7A:
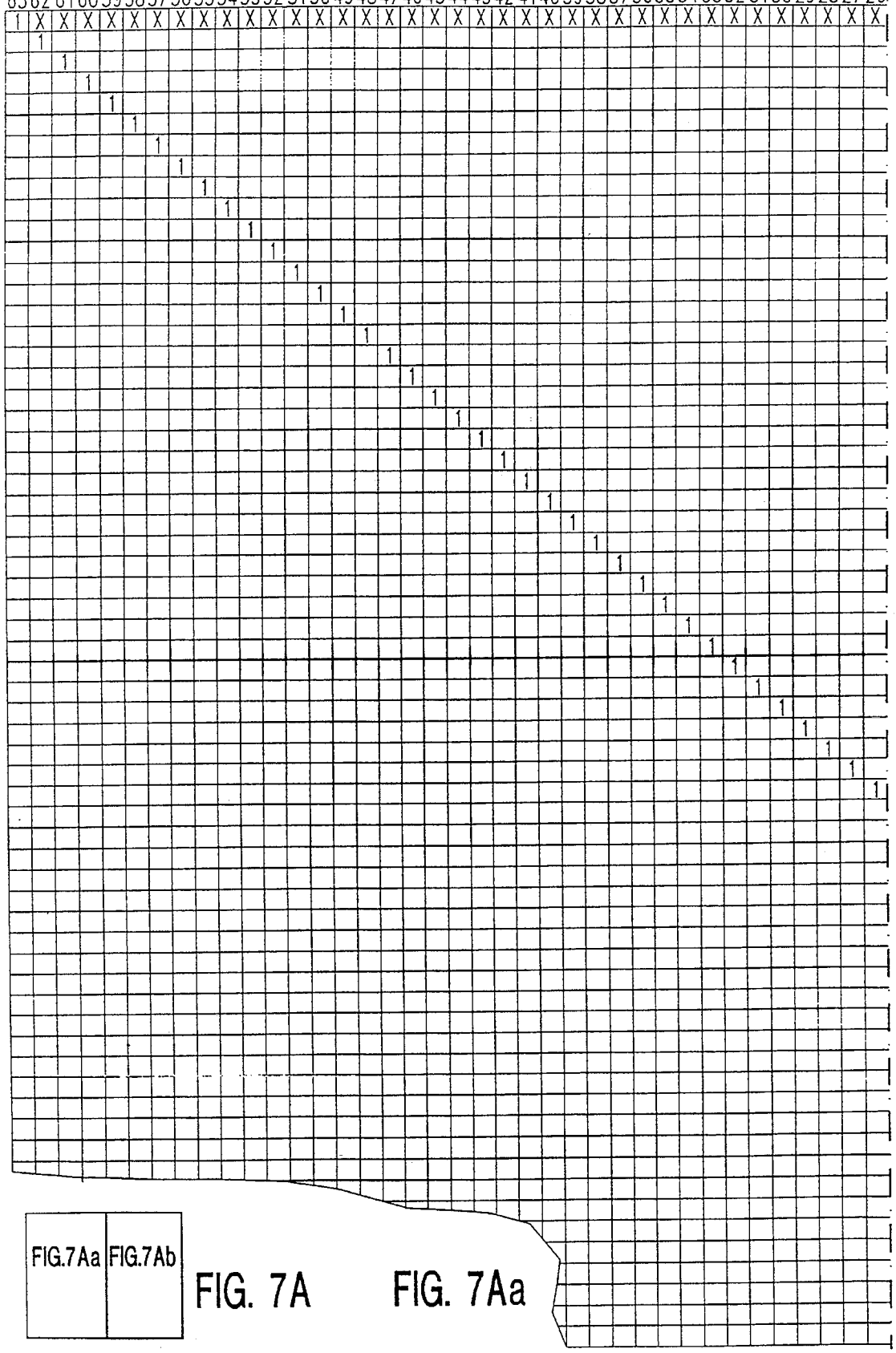
FIG. 7A, 7Aa and 7Ab are a chart showing all possible bit locations of a leading "1" in a 64-bit binary data field.

An embodiment of the present invention for use with a 64-bit data field is shown in block diagram form in FIG. 6. This embodiment requires additional bits "B" and "C" to provides the binary signal shown in FIG. 7B, corresponding to the number of leading zeros in the 64-bit field as shown in FIG. 7A. As in FIG. 2A, the X's indicate a "don't care" condition, that is, bits in the "X" locations can be a "1" or "0" for this embodiment.

Each D-E-F-G generator DEFG1–DEFG4 is identical to the D-E-F-G generator circuit shown in FIG. 4, with each outputting a "D", "E", "F" and "G" signal and a zero-detect signal for a 16-bit group of data. That is, DEFG1 outputs "D", "E", "F" and "G" signals, or a zero-detect signal $ZD16_1$, based on the status of bits 63-48 of the 64-bit field Similarly, DEFG2 outputs "D", "E", "F" and "G" signals, or a zero-detect signal $ZD16_2$, based on the status of bits 47-32 of the 64-bit field, DEFG3 outputs "D", "E", "F" and "G" signals, or a zero-detect signal $ZD16_3$, based on the status of bits 31-16 of the 64-bit field, and DEFG4 outputs "D", "E", "F" and "G" signals, or a zero-detect signal $ZD16_4$, based on the status of bits 15-0 of the 64-bit field.

The output $ZD16_1$ is input to one terminal of a 2-input NOR gate NOR5 and to the decoder circuitry DEC2, which is the same as that shown in FIG. 4. The output $ZD16_2$ is input to the other terminal of NOR5 and to the decoder circuitry DEC2. The output $ZD16_3$ is input to one terminal of a 2-input NOR gate NOR6 and to the decoder circuitry DEC2. Finally, the output $ZD16_4$ is input to the other terminal of NOR6 and to the decoder circuitry DEC2.

The outputs of NOR5 and NOR6 are provided to the two terminals of a 2-input NAND gate NAND10, which outputs the complement zero detect signal ZD64 for the entire 64-bit field. That is, when each bit in the entire 64-bit field contains a "0", the signal ZD64 is "0". As with the 16-bit circuit shown in FIG. 4, if a zero detect of "1" is desired, another inverter INV105 can be added, and the zero detect signal can be taken at the output of that inverter. Hence, the true zero detect "1" is achieved with only one additional logic delay.

The 64-bit embodiment of FIG. 6 comprises four 4-way multiplexors MUX4-7, and one 2-way multiplexor MUX8. The multiplexors MUX4-7 are coupled to the decoder circuit DEC2 in a manner similar to that in which MUX1 and MUX2 are coupled to DEC1.

That is, the inputs IN1-4 (not shown) of MUX4 receive the "D" signals output by DEFG1-DEFG4, respectively. Accordingly, the inputs S1-S4 and S1not-S4not receive signals from DEFG1-DEFG4 and the decoder DEC2 to control which of the "D" signals is output. In particular, when input "S1" is "1" and "S1not" is "0", the "D" signal from DEFG1 is output by MUX4, when "S2" is "1" and "S2not" is "0", the "D" signal from DEFG2 is output by MUX4, when input "S3" is "1" and "S3not" is "0", the "D" signal from DEFG3 is output by MUX4, and when "S4" is "1" and "S4not" is "0", the "D" signal from DEFG4 is output by MUX4. As for the 16-bit embodiment, DEC2 and DEFG1-DEFG4 are configured so that only one of the four passgates (not shown) of each of the multiplexors MUX4-7 are activated to pass a signal at any one time.

In a similar manner, the inputs IN1-4 (not shown) of MUX5 receive the "E" signals output by DEFG1-DEFG4, respectively, the inputs IN1-4 (not shown) of MUX6 receive the "F" signals output by DEFG1-DEFG4, respectively, and the inputs IN1-4 (not shown) of MUX7 receive the "G" signals output by DEFG1-DEFG4. Accordingly, the inputs S1-S4 and S1not-S4not of MUX5 receive signals from DEFG1-DEFG4 and the decoder DEC2 to control which of the "E" signals is output, the inputs S1-S4 and S1not-S4not of MUX6 receive signals from DEFG1-DEFG4 and the decoder DEC2 to control which of the "F" signals is output, and the inputs S1-S4 and S1not-S4not of MUX7 receive signals from DEFG1-DEFG4 and the decoder DEC2 to control which of the "G" signals is output.

As with the multiplexors MUX1 and MUX2 of the 16-bit embodiment, an inverter is present in each multiplexor MUX4-7 to amplify the signal from any of the passgates (not shown) therein. Hence, these inverters invert the "D", "E", "F" and "G" signals provided by each of the circuits DEFG1-DEFG4 and which are inverted due to the presence of the inverters in MUX1 and MUX2, and INV7 and INV11 as described with regard to FIG. 4. Accordingly, the outputs "D", "E", "F" and "G" provided by MUX4-7, respectively, are the outputs shown in FIG. 7B, and do not require further inversion.

The 2-way multiplexor MUX8 is similar to the 2-way multiplexor MUX3 in the 16-bit embodiment in that it provides an additional bit "C" based on the zero detects $ZD16_1$-$ZD16_4$ of DEFG1-DEFG2. That is, passgates (not shown) in MUX8 receive signals from DEFG1-DEFG4 and DEC2 to output the "C" bit as a "1" or "0" in the manner shown in FIG. 7B. In particular, when the most significant "1" is in the group of bits 63 to 48 or 31 to 16, the "C" signal is a "1", and when the most significant "1" is in the group of bits 47-32 or 15-0, the "C" signal is a "0".

Figures 7A, 7B:
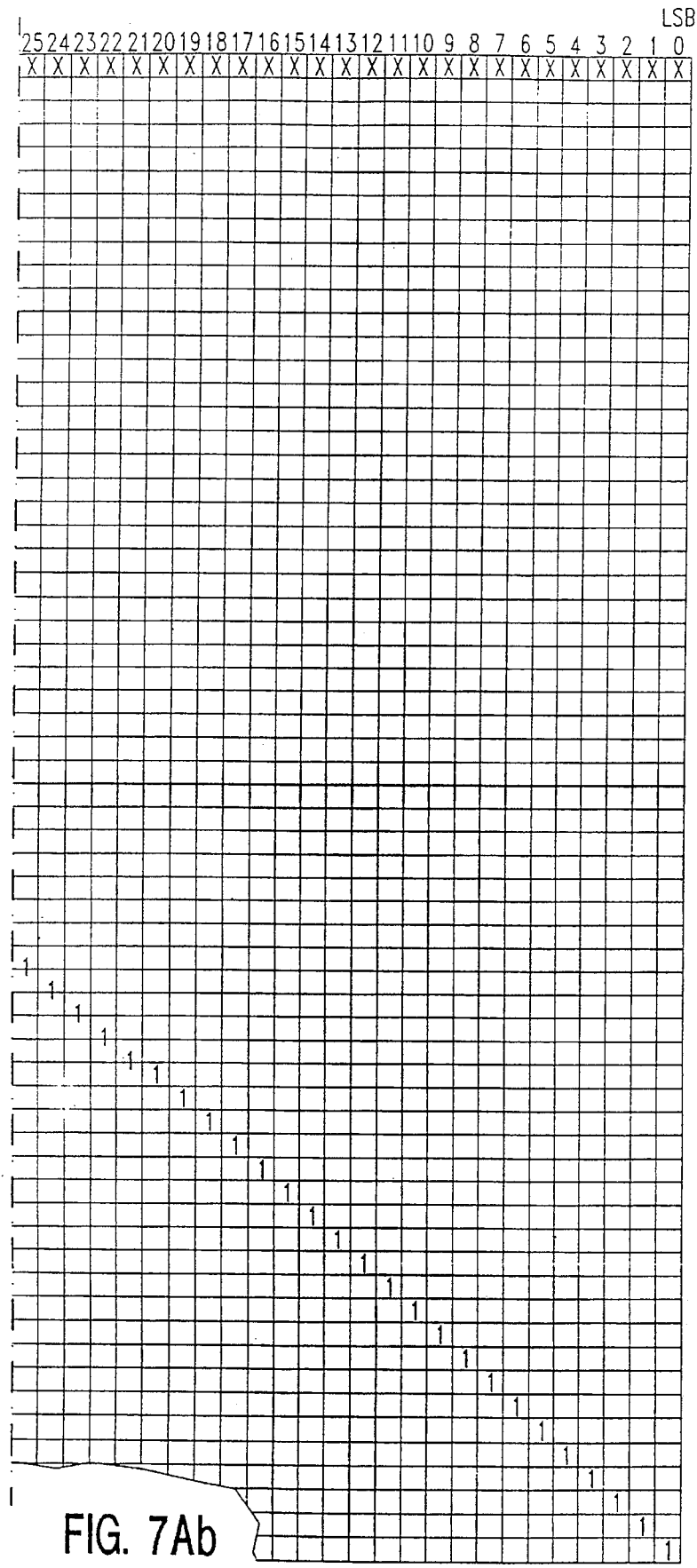
FIG. 7B is a chart, corresponding to FIG. 7A, which illustrates the status of the output signals provided by the embodiment of FIG. 6 in relation to the position of the leading "1" in the 64-bit binary data field.

Finally, the "B" signal having a pattern as shown in FIG. 7B is taken from the output of NOR5. In particular, when the most significant "1" is in the group of bits 63 to 32, the "B" signal is "1". Moreover, when the most significant "1" is in the group of bits 31 to 0, the "B" signal is "0".

Accordingly, the 64-bit embodiment, described above, provides a high speed circuit which both outputs a zero-detect if all bit of a 64-bit data field are "0", and locates the position of the leading "1" in that data field to output a binary signal representing the amount of leading zeros in the data field. The outputs "B" through "G" can be then provided to a bit shifter (not shown) such as a barrel shifter or the like, to effect the shifting of the 64-bit data string to thereby normalize the binary number represented by the data string, if desired.

While the invention has been particularly shown and described with reference to preferred embodiments thereof, it will be understood by those skilled in the art that various changes in form and details may be made therein without departing from the spirit and scope of the invention.

Having thus described our invention, what we claim as new and desire to secure by Letters Patent is:

1. An apparatus for determining, in a binary data field, a count of leading binary data bits each having the same predetermined value, said binary data bits leading the binary data field in a direction of one of a most significant bit and a least significant bit of the binary data field, comprising:

a plurality of detector circuits, each receiving a respective portion of a plurality of binary data bits of the binary data field, for determining which of the respective portions includes an opposite value binary bit having a value opposite to the predetermined value of the leading binary data bits, and outputting detector signals indicative thereof and which indicate the number of leading binary bits in the respective portion having the same predetermined value;

decoding means, coupled to said plurality of detector circuits, for determining, based on said detector signals, which of said portions contains a said opposite value binary bit that is one of a most significant and a least significant opposite value binary bit in the binary data field, and outputting decode signals indicative thereof, and for outputting, based on some of said detector signals, an indication signal indicating whether all of said binary data bits in said binary data field each have the predetermined value; and logic circuitry, comprising at least one 2-way multiplexor and at least one 4-way multiplexor, for determining the count of leading binary data bits based on said decode signals and said detector signals, and outputting a binary output signal representative thereof.

2. An apparatus as claimed in claim 1, wherein the amount of said 4-way multiplexors in said apparatus is equal to the amount of said detector circuits divided by 2 and the amount of said 2-way multiplexors in said apparatus is equal to the amount of said detector circuits divided by 4.

3. An apparatus as claimed in claim 1, wherein the logic circuitry comprises:

two 4-way multiplexors, each receiving a respective portion of said decode signals and a respective portion of said detector signals and outputting a bit of said binary output signal in accordance therewith; and one 2-way multiplexor for receiving another respective portion of said decode signals and outputting a bit of said binary output signal in accordance therewith.

4. An apparatus as claimed in claim 1, wherein:

said binary data field comprises 16 of said binary data bits and said plurality of detector circuits equals four, each of said four detector circuits receives 4 of said binary data bits; and said logic circuitry comprises:

two 4-way multiplexors, each coupled to said four detector circuits and said decoding means, for receiving a respective portion of said detector signals and a respective portion of said decode signals, and each outputting first and second bits of said binary output signal, respectively, in accordance therewith; and one 2-way multiplexor, coupled to said four detector circuits and said decoding means, for receiving another respective portion of said detector signals and another respective portion of said decode signals, and outputting a third bit of said binary output signal in accordance therewith.

5. An apparatus as claimed in claim 4, wherein said decoding means outputs a fourth bit of said binary output signal in accordance with a third respective portion of said detector signals.

6. An apparatus as claimed in claim 1, wherein one of said detector signals output by each of said detector circuits indicates whether the binary data bits in the respective portion received by that detector circuit all have the predetermined value.

7. An apparatus as claimed in claim 1, wherein the indication signal indicates whether all of said binary data bits in said binary data field each have a value of "0".

8. An apparatus for determining, in a binary data field, a count of leading binary data bits each having the same predetermined value, said binary data bits leading the binary data field in a direction of one of a most significant bit and a least significant bit of the binary data field, comprising:

a plurality of first logic circuits, each for receiving a respective portion of a plurality of binary data bits of the binary data field, each of said first logic circuits comprising:

a plurality of detector circuits, each receiving a respective segment of the respective portion of the plurality of binary data bits, for determining which of the respective segments includes an opposite value binary bit having a value opposite to the predetermined value of leading binary data bits in the respective portion, and outputting detector signals indicative thereof and which indicate the number of leading binary bits in the respective portion having the same predetermined value;

decoding means, coupled to said plurality of detector circuits, for determining, based on said detector signals, which of said segments contains a said opposite value binary bit that is one of a most significant and a least significant opposite value binary bit in the binary data field, and outputting decode signals indicative thereof; and logic circuitry for determining, based on said decode signals and said detector signals, a count of leading binary data bits in said respective portion, and outputting a binary output signal representative thereof, said logic circuitry comprising:

two 4-way multiplexors, each coupled to said four detector circuits and said decoding means, for receiving some of said detector signals and some of said decode signals, and each outputting first and second bits of said binary output signal, respectively, in accordance therewith; and one 2-way multiplexor, coupled to said four detector circuits and said decoding means, for receiving some of said detector signals and some of said decode signals, and outputting a third bit of said binary output signal in accordance therewith; and a second logic circuit for receiving each said binary output signal output by said first logic circuits, determining, based on at least said binary output signals, the count of leading binary data bits in said binary data field, and outputting a total count binary output signal representative thereof.

9. An apparatus as claimed in claim 8, wherein each of said first logic circuits outputs an indication signal indicating whether each of said binary data bits in said respective portion received by the first logic circuit have the predetermined value, and said second logic circuit determines the count of leading binary data bits in said binary data field based on said binary output signals output by each of said first logic circuits and said indication signals.

10. An apparatus as claimed in claim 8, wherein said second logic circuit outputs, based on at least said binary output signals output by each of said first logic circuits, an indication signal indicating whether each of said binary data bits in said binary data field have the predetermined value.

11. An apparatus as claimed in claim 8, wherein said second logic circuit comprises a second decoder circuit, coupled to said plurality of first logic circuits, for determining, based on at least said binary output signals, which of said respective portions contains a said opposite value binary bit that is one of a most significant and a least significant opposite value binary bit in that respective portion, and outputting second decode signals indicative thereof, said second logic circuit determining, based on said binary output signals and said second decode signals, the count of leading binary data bits in said binary data field, and outputting the total count binary output signal representative thereof.

12. An apparatus as claimed in claim 8, wherein:

said binary data field comprises 64 of said binary data bits, said plurality of first logic circuits equals four, each of said four first logic circuits receives 16 of said binary data bits and comprises four decoders, each receiving 4 of said 16 binary data bits.

13. An apparatus as claimed in claim 12, wherein said decoding means of each of said four first logic circuits outputs a fourth bit of said binary output signal output by said each of said four first logic circuit, respectively, in accordance with a third respective portion of said detector signals provided by said detectors in said respective first logic circuits.

14. An apparatus as claimed in claim 13, wherein:

said second logics circuit comprises:

a second decoder circuit, coupled to said plurality of first logic circuits, for determining, based on at least said binary output signals, which of said respective portions contains a said opposite value binary bit that is one of a most significant and a least significant opposite value binary bit in that respective portion, and outputting second decode signals indicative thereof;

four 4-way multiplexors, each coupled to one of said four first logic circuits and said second decoder circuit, for receiving a respective portion of said binary output signals output by said first logic circuits and a respective portion of said second decode signals, and outputting first, second, third and fourth bits of said total count binary output signal, respectively, in accordance therewith; and one 2-way multiplexor, coupled to said four first logic circuits and said second decoder circuit, for receiving another respective portion of said binary output signals output by said first logic circuit and another respective portion of said second decode signals, and outputting a fifth bit of said total count binary output signal in accordance therewith.

15. An apparatus as claimed in claim 14, wherein said second decoder circuit outputs a sixth bit of said total count binary output signal in accordance with a third respective portion of said binary output signals output by said first logic circuits.

16. A method for determining, in a binary data field, a count of leading binary data bits each having the same predetermined value, said binary data bits leading the binary data field in a direction of one of a most significant bit and a least significant bit of the binary data field, comprising the steps of:

storing a plurality of binary data bits representing the binary data field;

detecting portions of the plurality of binary data bits to determine which of the respective portions includes an opposite value binary bit having a value opposite to the predetermined value of the leading binary data bits, and outputting detector signals indicative thereof and which indicate the number of leading binary bits in the respective portion having the same predetermined value;

decoding said detector signals to determine which of said portions contains a said opposite value binary bit that is one of a most significant and a least significant opposite value binary bit in the binary data field, and outputting decode signals indicative thereof; and providing said decode signals and said detector signals to at least one 2-way multiplexor and at least one 4-way multiplexor to determine the count of leading binary data bits based on said decode signals and said detector signals, and outputting a binary output signal representative thereof.

17. A method as claimed in claim 16, further comprising the step of determining when all of said binary data bits in said binary data field have said predetermined value and outputting a signal indicative thereof.

18. A method as claimed in claim 16, wherein said sampling step samples groups of four of said data bits of said binary data field.

\* \* \* \* \*